March 22, 1960 J. J. A. P. VAN AMSTEL 2,929,971

SEMI-CONDUCTIVE DEVICE AND METHOD OF MAKING

Filed Sept. 18, 1958

INVENTOR
JOHANNES JACOBUS ASUERUS
PLOOS VAN AMSTEL

BY Frank R. Jeifari
AGENT

United States Patent Office 2,929,971
Patented Mar. 22, 1960

2,929,971

SEMI-CONDUCTIVE DEVICE AND METHOD OF MAKING

Johannes Jacobus Asuerus Ploos van Amstel, Eindhoven, Netherlands, assignor to North American Philips Company Inc., New York, N.Y., a corporation of Delaware Application September 18, 1958, Serial No. 761,911

Claims priority, application Netherlands September 23, 1957

15 Claims. (Cl. 317—234)

Figure 1:
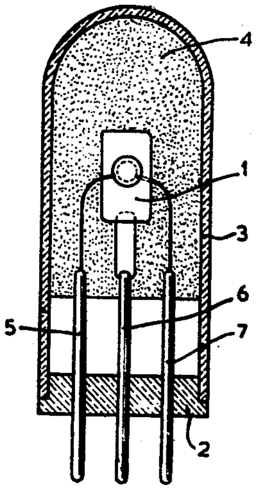

The invention relates to a semi-conductor device or semi-conductive blocking-layer system, particularly a transistor or a crystal diode, having a vacuum-tight envelope. It furthermore relates to methods of producing such blocking-layer systems.

In practice it has been found that the stability of semi-conductive blocking-layer systems, for example of germanium or silicon, leaves much to be desired, even if they are housed in a vacuum-tight envelope; this means that, in the long run and particularly if the systems are exposed to high temperatures, their electrical properties change, i.e. fall off strongly. It is found with germanium transistors, for example, that, after a long period of heavy loading or an increase in operation temperature up to, for example, 85° C., the current amplification factor $\alpha_{bc}$ has dropped considerably. The current amplification factor $\alpha_{bc}$ is to be understood to mean herein the magnitude which is defined by the equation: $\alpha_{bc}=(\Delta_{Ic}/\Delta_{Ib})_{Vce}$, wherein $\Delta_{I_c}$ and $\Delta_{I_b}$ designate small variations in the collector current and the base current respectively, measured at a constant voltage difference $V_{ce}$ between the emitter contact and the collector contact.

A known process providing very stable transistors consists in the so-called "vacuum baking," in which the blocking-layer system is heated in vacuo at a high temperature, for example 140° C. during the assembly operation. This treatment has, however, the disadvantage that the stability is achieved at the expense of the current amplification factor, which, during the treatment, falls off more and more until a very low value is reached, which, it is true, then remains stable. This process furthermore involves the technical difficulty that the blocking-layer system is to be finished in conditions that can be maintained only with extreme difficulties, i.e. in vacuo.

The invention has for its object to provide blocking-layer systems with a vacuum-tight envelope, which exhibit high stability which is maintained even if the blocking-layer system is exposed to high temperatures, for example of 140° C., and, moreover, satisfactory electrical properties, in the case of transistors inter alia a high current amplification factor. It has furthermore for its object, inter alia to provide simply realizable measures for the manufacture of such blocking-layer systems.

In accordance with the invention, arsenic is provided in the space between the envelope and the blocking-layer system proper in this assembly, particularly a transistor or a crystal diode having a vacuum-tight envelope. The arsenic is preferably provided in its free or elemental form. However, satisfactory results have been obtained also with arsenic in a bonded form, for example as an alloy such as for instance an indium-arsenic or a lead-arsenic alloy, or a compound such as for instance $As_2O_3$ or $AsI_3$.

The blocking-layer system proper is to be understood to mean herein the semi-conductive body with its electrodes, contacts and supply wires required to fulfil its function. The expression "provided in the space between the envelope and the blocking-layer system proper" is to be understood to mean also that arsenic is considered to be provided in the said space even if it is secured to the envelope or any mounting piece or to the blocking-layer system proper, unless it has, in its provided form or quantity, in an electrode on the semi-conductive body, only the function of determining the conductivity type and/or the conductivity. The normal quantities of electrode material used in an electrode on the semi-conductive body are practically insufficient for obtaining the desired stabilizing effect.

It is supposed that the stabilizing effect of arsenic on semi-conductive blocking-layer systems is due to the arsenic attack on the semi-conductive surface. An arsenic deposit is therefore arranged in the said space in a manner such that from this place arsenic or an arsenic compound can reach the semi-conductive surface. A preferred embodiment of a blocking-layer system with a vacuum-tight envelope is that in which the envelope is filled, at least partly, with a binder or fill which contains arsenic in a finely divided state, i.e. a powdery state. Excellent results have been obtained by means of binders containing 0.1 to 10% by weight arsenic in its free form. Beyond these limits, however, satisfactory results are also obtainable. As a binder, silico-organic polymers are particularly suitable; some of them are known under the name of silicone grease and silicone oil, which are commercially available under the trade-names of "Dow Corning DC 7" and "Dow Corning 702." There are furthermore other embodiments of blocking-layer systems according to the invention, for example those in which the quantity of arsenic is housed in the envelope and separated from the blocking-layer system proper by a porous wall of asbestos or quartz wool, the space around the blocking-layer system being filled, if desired, with a substance not reacting with the blocking-layer system, for example sand or, for example, those in which the blocking layer system proper is first surrounded by a lacquer layer and is housed in a way as described above with an arsenic deposit in a vacuum-tight envelope.

According to a further aspect tof the invention, referring to the method of manufacturing a semi-conductive blocking-layer system, particularly a transistor or a crystal diode, with a vacuum-tight envelope, a quantity of arsenic is provided during the finishing operations in the space between the envelope and the blocking-layer system proper, preferably arsenic in its free form. According to a very suitable form of such a method the space between the envelope and the blocking-layer system proper is filled, at least partly, with a binder, for example, silicone grease containing arsenic in a finely divided state. In order to accelerate the stabilizing process the blocking-layer system is heated for some time at a high temperature, after it has been closed in a vacuum-tight manner, preferably at a temperature between 80° C. and the melting temperature of one or more of the electrodes of the blocking-layer system, for example for 100 hours at 80° C. As an alternative, heating to a temperature beyond the melting temperature of one or more of the electrodes is permitted, particularly when the blocking-layer system has been previously surrounded by a lacquer layer.

For the gas filling of the envelope may be used the conventional gases, particularly the gases which are inert to the blocking-layer system, for example nitrogen, hydrogen, rare gas or mixtures thereof. Even air as a gas filling has yielded satisfactory results although the results obtained in this case are, as a rule, less satisfactory than those obtained with inert gases, such as nitrogen.

Very satisfactory results are obtained by carrying out the invention with semi-conductive blocking-layer systems of which the semi-conductive body is made of germanium or silicon, particularly with those blocking-layer systems which have a pnp-transistor structure. The blocking-layer systems according to the invention exhibit not only a satisfactory stability and a high current amplification factor, but they are even resistant to very high temperatures, for example up to 200 and 300° C.; after such a treatment their electrical properties, particularly the current amplification factor, appear to have hardly changed, whereas the known transistors, after such a thermal treatment, have become substantially useless as far as their electrical properties are concerned.

The invention and the results obtained thereby will now be explained with reference to two figures and a few examples.

Figure 2:
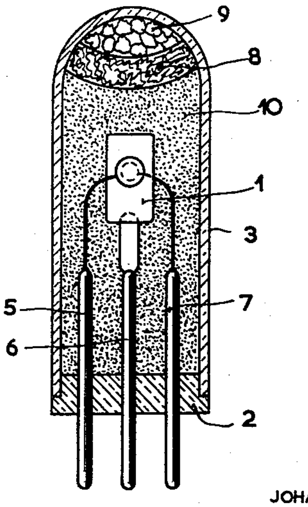

Figure 1 is a longitudinal sectional view of a transistor having a vacuum-tight envelope, in which, in accordance with the invention, arsenic is provided in the space between the envelope and the blocking-layer system proper. Figure 2 shows in a longitudinal sectional view of another embodiment a transistor according to the invention.

In Figure 1 the blocking-layer system proper 1 is arranged in a vacuum-tight glass envelope, which consists of two sealed portions, the glass base 2 and the glass bulb 3. Preferably the electrode system is arranged in glass envelope, since a metal envelope might react with the arsenic or arsenic compound more easily than the glass, which is neutral. However, the invention is of course not limited to glass envelopes. The space between the envelope 2, 3 and the semi-conductive system proper 1 is filled for a large part 4 with silicone grease containing arsenic in its free form in a finely divided state. The electrodes of the transistor are connected to the supply conductors 5, 6 and 7, which are taken to the outside through the glass base 2.

Some of the results obtained by carrying out the invention will now be compared with those obtained by means of transistors which are finished in known manner. In the examples hereinafter, which refer to germanium transistors, the semi-conductive system proper consisted each time of a pnp-alloy transistor of the same manufacturing series, obtained by alloying an emitter pellet and a collector pellet, both of pure indium, and a base contact of a tin-antimony alloy (95% by weight of Sn, 5% by weight of Sb) onto a germanium disc of about 150$\mu$ in thickness for about 10 minutes at 600° C. in a nitrogen-hydrogen atmosphere. In the following examples, which refer to silicon transistors, the semi-conductive system proper consisted each time of a pnp-silicon alloy transistor of the same manufacturing series, obtained by alloying an emitter electrode and a collector electrode, both of aluminum, and a base contact of a gold-antimony alloy (Au 99% by weight, Sb 1% by weight) onto an n-type silicon disc.

It should be noted that the following values of the current amplification factor were always measured at the transistor cooled down to room temperature.

It should be furthermore noted that the noise and the blocking or reverse current of the transistors according to the invention described in the following examples are both very low and appeared to be hardly subject to variation.

*Example I*

A pnp-germanium transistor was finished in known manner in a vacuum-tight glass envelope, which had previously been filled with dry silicone grease which has been dried at 100° C. for some time. The gas filling of the envelope consisted of nitrogen. The current amplification factor was, after sealing, 91; then the transistor was heated at 140° C. After two hours, after the transistor had been cooled to room temperature, the current amplification factor was again measured. It had then dropped to the value of 39. After heating at 140° C. for 200 hours, the $\alpha_{cb}$ of the transistor cooled down to room temperature was not more than 14. The stability of this transistor was very poor.

*Example II*

Of a germanium transistor of the same manufacturing series as that mentioned in Example I, finished in the same manner, the current amplification factor was 89 after sealing. During the subsequent endurance test, in which the transistor was heated at 85° C., the current amplification factor dropped more and more, so that, after 1000 hours, it was not more than 30. The stability of this transistor, finished in known manner without the use of the invention, was particularly poor.

*Example III*

A germanium transistor of the aforesaid type was heated, subsequent to after-etching, when the current amplification factor was still 97, in vacuo at 145° C. for three hours ("baked in vacuo"), in which state it was sealed in a glass envelope. Owing to the baking in vacuo the current amplification factor had dropped to 25, i.e. to about one fourth of the initial value. During a subsequent endurance test at 85° C. for 1000 hours the stability of the transistor appeared to be particularly satisfying, however, the current amplification factor was very low.

*Example IV*

A similar pnp-germanium transistor was finished in a glass envelope according to the invention, this envelope being filled previously to about 60% with dry silicone grease containing 5% by weight of free arsenic in grains. The total quantity of silicone grease was about 60 mgs. The envelope had furthermore a nitrogen gas filling. After sealing the current amplification factor was 61. Then the transistor was heated at 140° C. for 300 hours, so that the current amplification factor increased gradually. After the stabilisation the current amplification factor of the transistor, cooled down to room temperature, was 99; during subsequent endurance tests at 85° C. for 1000 hours this value did not change appreciably. The stability of this transistor finished in accordance with the invention was therefore particularly satisfying, while even the current amplification factor was particularly high. After these tests, the envelope was broken open, after which the current amplification factor of the transistor, which was still surrounded by the silicone grease with its arsenic dope decreased to 42 within about one minute. This is exhibited by practically all transistors finished in accordance with the invention.

*Example V*

Of a germanium transistor finished in accordance with the invention as indicated in Example 4 the current amplification factor was 61 after sealing. Then this transistor was heated at 85° C. for 1500 hours. The value of the current amplification factor measured at room temperature was, after 100, 500, 1000, and 1500 hours, 75, 87, 90 and 93, respectively. It appears therefrom that the stability of this non-preheated transistor according to the invention is satisfying in spite of the heavy thermal load. Then the transistor was heated at 140° C. for 100 hours, after which the $\alpha_{cb}$ was measured to be about 107.

*Example VI*

A germanium transistor of the same series was finished in a vacuum-tight glass envelope (gas filling of nitrogen), which was filled previously with silicone grease containing about 1% by weight of free arsenic in grains. The semi-conductive system proper had previously been provided with a coating of a lacquer known under the tradename of SR 98 and heated at 140° C. for ten hours. After sealing the $\alpha_{cb}$ of this transistor according to the invention was 76. After 165 hours heating at 140° C. $\alpha_{cb}$ had increased to 94. After 1000 hours at room temperature and during intermediate measurements, the current amplification factor was still 94. Then the transistor was heated at 300° C. for six hours. The transistor according to the invention appeared to be capable of withstanding this high thermal load, while the electrodes were in the molten state. The current amplification factor was, subsequent to this test, 115, while leakage currents and noise had maintained their particularly low values.

*Example VII*

A pnp-germanium transistor was finished as shown in Figure 2 in a vacuum-tight glass envelope, in which was previously arranged, below a quartz wool plug 8, some grains 9 of arsenic (total weight about 1 mg.). The space 10 below the plug 8 was filled with dry $SiO_2$. For the rest the transistor of Figure 2 is the same as that of Figure 1. After sealing the current amplification factor was 63. After 50 hours heating at 140° C., it had increased to 74, and after a heating of 250 hours at 140° C. it was 99. After a subsequent heating at 100° C. for 500 hours the variations in the electrical properties, particularly in the $\alpha_{cb}$ remained within a range of 2%. The same applies to the subsequent endurance test, in which the transistor was loaded at an ambient temperature of 50° C. for 500 hours by 50 mw. (collector-base voltage 10 v.; emitter current 5 ma.).

*Example VIII*

A further pnp-germanium transistor of the same series was finished in a vacuum-tight glass envelope and the space between the envelope and the transistor proper was filled for a large part with silicone grease mixed with 10% by weight of fillings of an arsenic compound (in 95% by weight, as 5% by weight). The semi-conductive system proper had previously been surrounded by a lacquer known under the tradename of "Araldite" and hardened at 100° C. for 15 hours. The current amplification factor was 39 after sealing. After 50 hours heating at 140° C., $\alpha_{cb}$ had increased to 91. After a further 200 hours heating at 140° C., $\alpha_{cb}$ was 107. Then the transistor was subjected to an endurance test, in which it was heated at 50° C. and simultaneously loaded with 50 mw. (collector-base voltage 10 v.; emitter current 5 ma.). After having been subjected to this endurance test for one week, $\alpha_{cb}$ appeared to be 110 at room temperature. After a further two weeks of the same load $\alpha_{cb}$ was 100. From this example it is evident that even transistors containing arsenic in bonded form in the space between the envelope and the blocking-layer system proper exhibit satisfactory stability and a high current amplification factor and are capable of withstanding heating at a comparatively high temperature.

*Example IX*

A pnp-germanium transistor was finished in a vacuum-tight glass envelope (gas filling of nitrogen), which was filled with silicone grease mixed, in accordance with the invention, with an arsenic compound, i.e. 5% by weight of $As_2O_3$. The semi-conductive system proper had been previously provided with a layer of a lacquer known under the tradename of "SR 98." After sealing $\alpha_{cb}$ was 57. Then the assembly was heated at 85° C. During the first 500 hours $\alpha_{cb}$ dropped to 41, but after 1000 hours $\alpha_{cb}$ was again 59. The transistor was heated at 140° C. for 100 hours, so that $\alpha_{cb}$ increased to 104. Then the transistor was heated at 300° C. for six hours, after which a measurement at room temperature exhibited a current amplification factor of 110.

It should be noted that with the transistors according to the invention, which are not heated, after sealing, at a high temperature for some time, sometimes a decrease in $\alpha_{cb}$ is stated. Such transistors according to the invention are therefore heated preferably at a high temperature for some time, for example at 140° C. until a stable, high final value of the $\alpha_{cb}$ is attained.

*Example X*

A pnp-transistor of silicon was arranged, in accordance with the invention, in a vacuum-tight glass envelope, filled previously for a large part with silicone grease containing 5% by weight of arsenic in a finely divided state. After sealing the current amplification factor was 24. Then the transistor was heated at 140° C. After 50, 200, 350 hours $\alpha_{cb}$ at room temperature was 24, 25 and 24 respectively. Also a silicon transistor thus appears to be quite satisfactorily stabilizable by using the invention.

*Example XI*

A similar pnp-silicon transistor was finished, without using the invention, in a vacum-tight glass envelope filled with dry silicone grease (without arsenic). After sealing $\alpha_{cb}$ was 28; after 350 hours of heating at 140° C. this value had dropped to 16. The transistor according to the invention referred to in Example 10 therefore has a materially better stability.

It should finally be noted that the invention is not restricted to the examples described above. The quantity of arsenic, for example, is not critical, although an excessively large and an excessively small quantity should be avoided. It is furthermore not restricted to alloy transistors and neither to the semi-conductors explicitly referred to above. Within the scope of the invention many variants are possible to those skilled in the art. The invention may advantageously also be applied to semi-conductive electrode systems comprising a semi-conductor body consisting of a semi-conductor compound, such as the so called $A_{III}B_V$ compound, for instance Ga As, In P, Ga Sb, AlAs.

What is claimed is:

1. A semi-conductor device comprising a vacuum-tight-sealed envelope, a semi-conductive blocking-layer system within the envelope, and arsenic in the space between the envelope and the blocking-layer system.

2. A semi-conductor device as set forth in claim 1 wherein the arsenic is present in its elemental form.

3. A semi-conductor device as set forth in claim 1 wherein the arsenic is present in a state bound to another element.

4. A semi-conductor device comprising a vacuum-tight-sealed envelope, a junction-containing semi-conductive body and contacts within the envelope, a fill in the space between the envelope and the semi-conductive body and contacts, and finely-divided arsenic dispersed throughout the fill to stabilize the electrical properties of the device.

5. A device as set forth in claim 4 wherein the fill is a silico-organic polymer.

6. A device as set forth in claim 4 wherein the fill contains between about 0.1 and 10% by weight of arsenic.

7. A P-N-P transistor comprising a vacuum-tight-sealed envelope, a junction-containing semi-conductive body selected from the group consisting of germanium and silicon and contacts to said body within the envelope, an inert fill in the space between the envelope and the body and contacts, and between about 0.1 and 10% by weight of arsenic in the fill to stabilize the electrical properties of the transistor.

8. A transistor as set forth in claim 7 wherein the envelope is of glass.

9. A P-N-P transistor comprising a vacuum-tight-sealed envelope, a semi-conductive wafer with electrodes within the envelope, a fill in the space between the envelope and the wafer, and a finely-divided arsenic-containing substance dispersed throughout the fill and accessible to the wafer surfaces.

10. A transistor as set forth in claim 9 wherein a lacquer coating is provided on the wafer and electrodes.

11. A semi-conductor device comprising a vacuum-tight-sealed envelope, a semi-conductive blocking-layer system within the envelope, a small quantity of arsenic in the space between the envelope and the blocking-layer system to stabilize the electrical properties of the device, and a porous wall member separating the arsenic from the blocking-layer system.

12. A method of making a stable semi-conductor device constituted of an envelope housing a blocking-layer system, comprising the steps of introducing into the envelope in the space between the latter and the blocking-layer system a quantity of arsenic, vacuum-tight-sealing the envelope, and heating the sealed envelope at an elevated temperature.

13. A method as set forth in claim 12 wherein the elevated temperature is at least 80° C.

14. A method as set forth in claim 13 wherein the envelope is maintained at an elevated temperature of at least 80° C. for at least 100 hours.

15. A method of making a stable semi-conductor device constituted of an envelope housing a transistor comprising the steps of introducing into the envelope in the space between the latter and the transistor a silicone grease fill containing a small quantity of finely-divided arsenic, vacuum-tight-sealing the envelope, and heating the sealed envelope at an elevated temperature of at least 80° C. to stabilize the transistor's current amplification factor.

No references cited.